April 12, 1938.    H. G. DAY    2,113,914

MIXING MACHINE

Filed Dec. 7, 1936

INVENTOR
HARRY G. DAY
BY
G. H. Braddock
ATTORNEY

Patented Apr. 12, 1938

2,113,914

UNITED STATES PATENT OFFICE 2,113,914

MIXING MACHINE

Harry G. Day, Minneapolis, Minn.

Application December 7, 1936, Serial No. 114,654

22 Claims. (Cl. 259—97)

This invention relates to a mixing machine useful for many purposes, but more especially useful in the manufacture of balanced ration stock and poultry feeds.

Dry and molasses feeds for stock and poultry include various ingredients, as, for example, bran, middlings, dairy mash products, molasses, oil meal, gluten, cotton seed, etc. Machines for mixing the ingredients of stock and poultry feeds are well known. Speaking generally, the various ingredients for producing stock and poultry feeds are separately deposited in the machines, one after another, each in predetermined and desired quantity, the machines cause the different ingredients to be commingled together, and means is included whereby the resulting concentrates, batches, or mixtures can be removed from the machines when ready for use.

An object of the present invention is to provide a mixing machine, for causing different ingredients for providing a concentrate or batch to be commingled or blended together, which will be of novel and improved construction.

A further object is to provide a mixing machine wherein will be incorporated various improved features and characteristics of construction novel both as individual entities of the machine and in combination with each other.

A further object is to provide a mixing machine which will include a novel and improved construction and arrangement of means for directly and continuously concurrently operating upon a plurality of different ingredients, as, for example, ingredients for producing stock and poultry feeds, in such manner as to successively and positively separate and remove small quantities of each ingredient from a main quantity thereof and to cause the small separated quantities of the different ingredients, respectively, to become intimately commingled and blended, whereby to at once preclude the possibility of stratification of any ingredient in the machine and cause thorough mixing and blending of the different ingredients in a minimum of time.

A further object is to provide a mixing machine which will include a hopper into which various ingredients to be mixed can be loaded, an upright hollow cylinder or member having a rotatable lifting and mixing element therein for conveying ingredients one after another upwardly, an upright chamber for receiving the ingredients conveyed upwardly through the hollow cylinder or member, one or more upright passageways to which said receiving chamber is adapted to deliver portions of material from different ingredients more or less in stratified form in the receiving chamber, the upright passageway or passageways being above and having communication with a lower portion of the hollow cylinder or member, and one or more rotatable cutting or separating or reducing blades, beaters, or elements for each upright passageway employed, extending longitudinally of the passageway and arranged adjacent to the location of entry of the ingredients from the receiving chamber to the passageway, for directly and continuously concurrently operating upon a plurality of different ingredients in the receiving chamber and successively and positively separating and removing small quantities or slices or slabs of each ingredient from a main quantity thereof and causing the small separated and removed quantities or slices or slabs of the different ingredients to be deposited into the passageway or passageways employed and delivered by gravity to position whence said small separated and removed quantities or slices or slabs can be fed upwardly through said hollow cylinder or member back to said receiving chamber.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Figure 1:
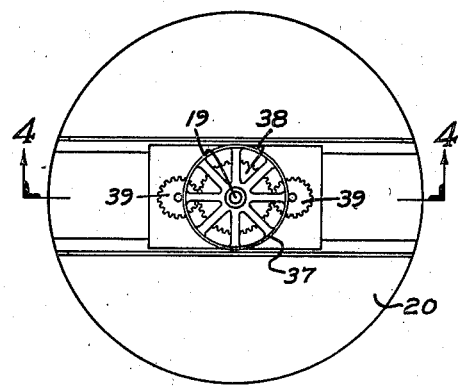
Fig. 1 is a plan view of a mixing machine in which the features of the invention are incorporated.

With respect to the drawing and the numerals of reference thereon, a floor of a building is represented at 10. A loading hopper 11 is beneath the floor 10, and the mixing machine is as disclosed supported by the floor above the loading hopper, numeral 12 denoting uprights attached to the body of the mixing machine and resting upon the floor. A material receiving opening 13 through the floor affords communication to the loading hopper. The arrangement of the loading hopper beneath the floor precludes the necessity for lifting sacks containing ingredients to be mixed to said loading hopper, and any ingredients which are spilled can be swept into the loading hopper.

An upright hollow cylinder or member 14 of the mixing machine includes a lower portion thereof situated beneath the floor and in the loading hopper, in spaced relation to the walls of said loading hopper.

Figure 2:
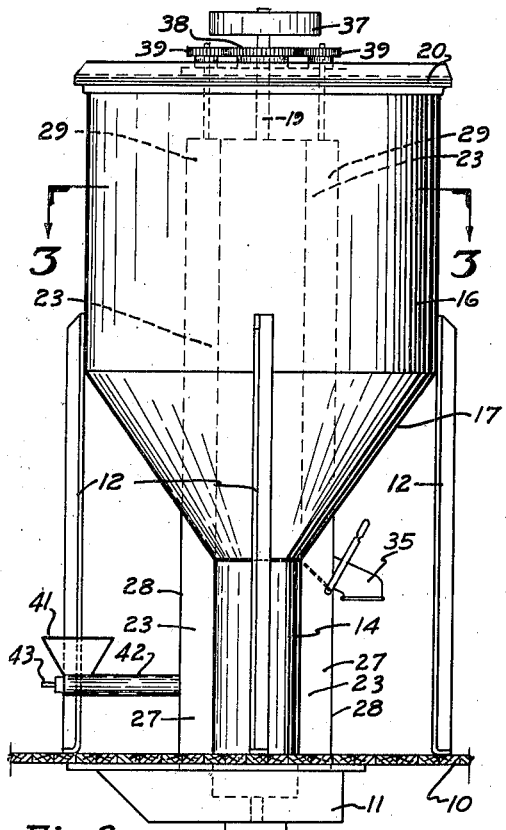
Fig. 2 is an elevational view of the machine of Fig. 1.

An upright material receiving chamber 15 in surrounding relation to the upper portion of the hollow cylinder or member 14 is provided by an upright drum including an upper cylindrical part 16 and a lower tapering or converging part 17. That is, the material receiving chamber 15 tapers or converges at its lower portion. The lower end of the tapering or converging part 17 meets the hollow cylinder or member 14 for portions of its circumference, as shown more clearly in Fig. 2.

A rotatable lifting and mixing element extends longitudinally through the upright hollow cylinder or member 14. Said lifting and mixing element as disclosed consists of a mixing screw or spiral conveyor 18 fixed upon an upright shaft 19. The mixing screw or spiral conveyor 18 is of diameter just less than the diameter of the hollow cylinder or member 14 so as to nicely carry material up through said hollow cylinder or member, and the upper and lower end portions of said mixing screw or spiral conveyor extend slightly beyond the upper and lower ends, respectively, of the hollow cylinder or member.

Figure 4:
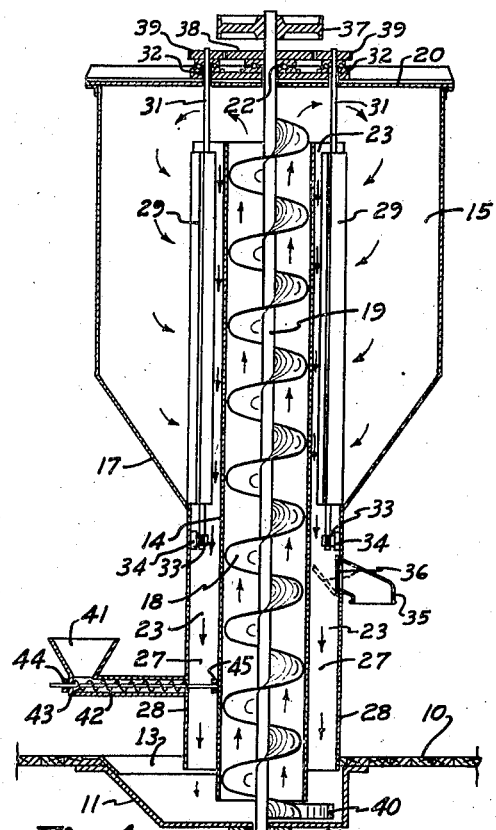
Fig. 4 is a vertical sectional view taken on line 4—4 in Fig. 1.

A cover for the upper portion of the drum defining the material receiving chamber 15 is denoted 20. Said drum extends to position somewhat above the hollow cylinder or member 14 and the mixing screw or spiral conveyor 18, so that the cover 20 is spaced from said hollow cylinder or member and said mixing screw or spiral conveyor, desirably a distance about as disclosed in Fig. 4, to provide clearance for the conveyance of material from the upper end of the hollow cylinder or member 14 to the portion of the receiving chamber 15 which is below the upper end of said hollow cylinder or member.

The lower portion of the mixing screw or spiral conveyor 18 includes an extension hook or member 40 below the hollow cylinder or member 14 and within the hopper 11. The hook or member 40 assists in carrying the material to be mixed into the hollow cylinder or member 14.

The upright shaft 19 which carries the mixing screw or spiral conveyor 18 as disclosed has its lower end rotatably mounted, as at 21, upon the base of the loading hopper, and has its upper end portion rotatably mounted, as at 22, in the cover 20.

As disclosed, the mixing machine includes two upright passageways 23 at the inner side of the receiving chamber 15 adjacent the upright hollow cylinder or member 14, and said passageways 23 extend downwardly below the receiving chamber and into the loading hopper 11. A greater or less number of pasageways 23 could be employed. The upper part of each passageway 23 is defined at its inner portion by an outer surface of the upper portion of the hollow cylinder or member 14, at its sides by spaced apart upright walls 24, and at its outer portion by an upright wall 25 the side edges of which meet the walls 24, 24. Each wall 25 has an elongated inlet 26 for conveyance of material from the receiving chamber 15 to the corresponding passageway 23, and each inlet 26 desirably extends longitudinally of its corresponding passageway. Each passageway 23 extends downwardly desirably from about the elevation of the upper end of the hollow cylinder or member 14, and each inlet 26 terminates at its lower end at about the elevation of the lower end of the tapering or converging part 17. The lower part of each passageway 23, that is, the part below the inlet 26 and the lower end of the tapering or converging part 17, is defined at its inner portion by an outer surface of the lower portion of the hollow cylinder or member 14, at its sides by spaced apart upright walls 27 which may be continuations of the walls 24, and at its outer portion by a closed upright wall 28. The lower ends of the walls 27, 28, 27 of each passageway 23 terminate just below the floor within the loading hopper. The lower end portion of the part 17 of the drum defining the receiving chamber 15 is cut away at the locations of the walls defining the passageways 23 to allow clearance for said passageways and walls. The upright outer walls 28 meet the lower end of said part 17 at location between the adjacent side walls 24, 27. That is, the lower part of each passageway 23, below the inlet 26 and the lower end of the tapering or converging part 17, is closed at its sides and outer portion by the corresponding walls 27, 27, 28, the walls 27 and 28 meeting each other and also closing the lower end of the part 17 at locations surrounding the passageways 23. Communication from the receiving chamber 15 to substantially the full length of the upper portion of each passageway 23 is through the corresponding elongated, longitudinally extending inlet 26, and the lower portion of each passageway 23 is a continuation of the upper portion thereof and is adapted to convey material which enters the upper portion of the passageway by gravity to the loading hopper 11, whence said material can be fed upwardly through the hollow cylinder or member 14. The floor 10 desirably is fitted about the lower end portions of the hollow cylinder or member 14 and the passageways 23, as will be understood.

A set, denoted 29, of upright rotatable cutting or separating or reducing blades, beaters, or elements extends longitudinally of each passageway 23 and is arranged within the passageway adjacent to the corresponding elongated inlet 26. Desirably, the blades, beaters, or elements of each set 29 of blades, beaters, or elements extend substantially the full length of the corresponding inlet 26, as will be more clear from Fig. 4. It is the function of said blades, beaters, or elements of the different sets 29 to directly and continuously concurrently operate upon a plurality of different ingredients in the receiving chamber 15 and successively and positively separate and remove small quantities or slices or slabs of each ingredient from a main quantity thereof and deposit the small separated and removed quantities, slices or slabs into the corresponding passageway 23 through the corresponding elongated inlet 26, whence the small quantities, or slices or slabs will be delivered by gravity through a clearance space of each passageway 23 at the rear of the blades, beaters, or elements to the loading hopper 11, in position for conveyance upwardly through the hollow cylinder or member 14 to the receiving chamber 15.

As disclosed, each set 29 of upright blades, beaters, or elements includes four paddles 30 arranged at 90 degrees apart and fixed upon and extending longitudinally of an upright shaft 31. An upper portion of each shaft 31 is rotatably mounted in the cover 20, as at 32, and a lower portion of each shaft 31 is rotatably mounted, as at 33, in a bracket 34 carried by one of the walls 28. It will be evident that upon rotation of the shafts 31 in either direction, material will be wiped out of the receiving chamber 15 through the elongated inlets 26 into the passageways 23, whence the material will fall through the space of said passageways back of the paddles 30 into the loading hopper 11.

The lower part of one of the passageways 23 includes a discharge or sack spout 35 which is controlled by a manually operable gate 36 in customary manner. The hopper 11 is as disclosed loaded at one side of the machine and the discharge or sack spout is at the opposite side. Bags to receive the concentrate, batch, or mixture may be attached to the discharge or sack spout 35 and rest upon the floor or upon a vibrating platform or member. In practice, each passageway 23 will desirably include a discharge or sack spout 35.

The shafts 19 and 31, 31 may be belt or motor driven. As shown, the upper end of the shaft 19 fixedly carries a pulley 37 adapted to be driven by a belt. Said shaft 19 also fixedly carries a gear 38 which is situated between the pulley 37 and the cover 20. The gear 38 meshes with smaller gears 39, including one gear 39 fixed upon the upper end of each shaft 31. It will be evident that upon rotation of the pulley 37 all of the shafts 19, 31, 31 will be rotated. Rotation of the shaft 19 will cause the mixing screw or spiral conveyor 18 to elevate material through the hollow cylinder or member 14, and rotation of the shafts 31 will cause each set 29 of upright rotatable cutting or separating or reducing blades, beaters, or elements to be actuated to function in the manner as hereinbefore set forth.

In the practical operation of the mixing machine the various ingredients to be mixed are separately deposited in the loading hopper 11, each ingredient being placed in the machine in the desired quantity predetermined by the characteristics the finished concentrate, batch, or mixture is to possess. The mixing screw or spiral conveyor 18 together with the mixing hook or member 40 will upon rotation convey the ingredients, one after another, through the hollow cylinder or member 14 and out of the upper end thereof, whence the ingredients will be spilled to the receiving chamber 15 and the lower tapering or converging portion thereof. The screw or conveyor 18 will cause the different ingredients lifted thereby to be mixed or commingled, but to some extent the various ingredients will settle in the receiving chamber 15 so that each ingredient is in a more or less stratified condition. That is, the receiving chamber 15 will contain the different ingredients arranged, to a greater or smaller degree, in stratified horizontally disposed layers. The different ingredients will by gravity, and especially because of the tapering or converging lower portion of the receiving chamber 15, have potential to fall downwardly and inwardly toward each passageway 23 and through its corresponding elongated inlet 26. Each paddle 30 will when rotated past the corresponding inlet 26 remove a quantity, slice or slab of material from each of the different ingredients stratified, roughly, in layers and crowding down and toward and into the elongated inlet 26. The quantities, slices or slabs removed will be pushed or deposited by the paddles 30 into the passageways 23, and as quantities, slices or slabs are removed from the receiving chamber 15, the material of the different ingredients will continue because of gravity to crowd down and toward and into said elongated inlets 26 to position to be removed slice by slice and carried into said passageways 23 by said paddles 30. It is to be noted that no material can pass to the hopper 11 from the receiving chamber 15 except that which travels through the passageways 23, and all of the material which travels through said passageways is separated and removed from the mass of material in the manner as set forth. The material which enters the hopper 11 from the passageways 23 is carried up through the hollow cylinder or member 14 back to the receiving chamber, and the process is continuous. The concentrate, batch, or mixture is removed from the discharge or sack spout 35 while the working parts of the mixing machine are at rest.

It will be evident that all of the material fed upwardly through the hollow cylinder or member 14 and into the upper portion of the receiving chamber 15 will travel downwardly through the passageways 23 past the paddles 30. And the material first fed into the receiving chamber 15 will first leave said chamber. That is, each succeeding quantity of material fed into the receiving chamber will be deposited upon the immediately preceding quantity and crowd it down and inwardly into the passageways 23, so that succeeding quantities of material fed into said receiving chamber will not be removed therefrom and carried to the hopper 11 until preceding quantities have reached said hopper from the receiving chamber.

When the whole batch has been subjected once to the action of the paddles 30, there will obviously result a fairly thoroughly blended mixture of different ingredients distributed homogeneously throughout the mass. When the whole batch has been subjected several times to the action of said paddles 30, there will result a completely and perfectly blended mixture. The process of providing a completely and perfectly blended, homogeneous mixture can by employment of the mixing machine of the invention be completed in a minimum of time. None of the batch can remain stationary or stratified in the receiving chamber 15, because it is the function of the paddles 30, or equivalent, to constantly have tendency toward destroying stratification. The downwardly flaring receiving chamber insures that all of the material fed into the upper portion of said receiving chamber will enter one or the other of the passageways 23.

Figure 3:
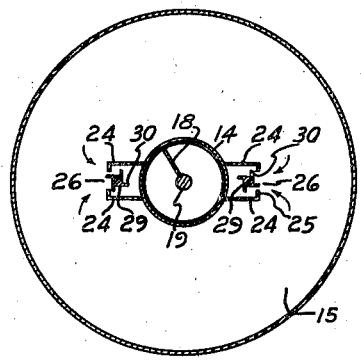
Fig. 3 is a horizontal sectional view taken on line 3—3 in Fig. 2.

It will be understood that the rotatable lifting and mixing element with its hook or member is operated sufficiently rapidly to cause considerable commingling of the different ingredients while passing upwardly through the hollow cylinder or member 14, and that the material is thrown from the upper end of said hollow cylinder or member 14 with considerable force. The rotative action of the mixing screw or spiral conveyor 18 causes the material to enter the receiving chamber with a turbulent, swirling motion, as indicated by the arrows in Figs. 3 and 4. The turbulence and swirling of the material in the receiving chamber 15 causes commingling of the different ingredients, and also assists in directing each particle of the material conveyed from the hollow cylinder or member 14 to the receiving chamber 15 into one or another of the passageways 23 through its elongated slot 26. Commingling of the different ingredients also occurs while the material is traveling downwardly through the passageways 23 and thence through the hopper 11 to the lower end of the hollow cylinder or member 14.

In the disclosure as made, the shafts, 31, 31 are rotated at greater speed than is the shaft 19. The paddles or beaters 30 advance quite rapidly and the striking of said paddles or beaters against the material causes considerable turbulence and mixing of the different ingredients.

When quite small quantities of materials are to be added to the batch, as, for example, when it is desired to add vitamins, the small quantities are loaded into a relatively small hopper 41 and are fed to a passageway 23 through a horizontal pipe or tube 42 which supports the hopper 41 upon a wall 28 and affords communication between said hopper and passageway. A small feed screw 43 in the pipe or tube 42 is adapted to be rotated at any desired speed. Said feed screw 43 is mounted upon the pipe or tube 42 as at 44 and upon the hollow cylinder or member 14 as at 45. The materials which enter the passageway 23 from the small hopper 41 obviously become mixed with the bulk of materials.

What is claimed is:

1. A mixing machine comprising means including a feeding element, a hollow member, a receiving chamber and conveying connections between said hollow member and said receiving chamber for circulating different ingredients to be commingled together, and means for directly and continuously concurrently operating upon a plurality of said different ingredients to successively and positively separate and remove small quantities of each ingredient operated upon from a main quantity thereof and to cause the small separated and removed quantities of the different ingredients, respectively, to become intimately commingled together.

2. A mixing machine comprising means including an upstanding hollow member, a lifting element in said hollow member, an upstanding receiving chamber, a communicating connection between an upper portion of said hollow member and said receiving chamber and a communicating connection between a lower portion of said receiving chamber and said hollow member for circulating different ingredients to be commingled together, and means for directly and continuously concurrently operating upon a plurality of said different ingredients while traveling from said receiving chamber to said hollow member to successively and positively separate and remove small quantities of each ingredient operated upon from a main quantity thereof and to cause the small separated and removed quantities of the different ingredients, respectively, to become intimately commingled together.

3. The combination as specified in claim 2, wherein said lifting element is constituted as a spirally formed mixing conveyor.

4. A mixing machine adapted to receive a plurality of different ingredients to be commingled together, comprising an upstanding hollow member having a rotatable lifting element therein for conveying different ingredients one after another upwardly, an upstanding chamber for receiving the different ingredients conveyed upwardly through said hollow member, an upstanding passageway to which said receiving chamber is adapted to deliver portions of material from different ingredients in said receiving chamber, said upstanding passageway having communication with a lower portion of said hollow member and having an elongated inlet leading from said receiving chamber, and a rotatable, elongated reducing blade adjacent to and extending longitudinally of said elongated inlet and adapted to directly and continuously concurrently operate upon a plurality of different ingredients in the receiving chamber and successively and positively separate and remove small quantities of each ingredient from a main quantity thereof and cause the small separated and removed quantites of the different ingredients to be deposited in said upstanding passageway and delivered by gravity to position whence said small separated and removed quantities can be fed upwardly through said hollow member to said receiving chamber.

5. The combination as specified in claim 4, wherein said rotatable lifting element is constituted as a spirally formed mixing conveyor.

6. The combination as specified in claim 4, wherein said rotatable lifting element is constituted as a mixing conveyor adapted to deliver material from said hollow member to an upper portion of said receiving chamber with a turbulent, swirling motion.

7. A mixing machine comprising a hopper for receiving a plurality of different ingredients to be mixed, an upstanding hollow member having a rotatable lifting element therein for conveying different ingredients one after another upwardly from said hopper, an upstanding chamber for receiving the different ingredients conveyed upwardly through said hollow member, an upstanding passageway to which said receiving chamber is adapted to deliver portions of material from different ingredients in said receiving chamber, said upstanding passageway having communication with said receiving hopper and having an alongated inlet leading from said receiving chamber, and a rotatable, elongated reducing blade adjacent to and extending longitudinally of said elongated inlet and adapted to directly and continuously concurrently operate upon a plurality of different ingredients in the receiving chamber and successively and positively separate and remove small quantities of each ingredient from a main quantity thereof and cause the small separated and removed quantities of the different ingredients to be deposited in said upstanding passageway and delivered therethrough by gravity to said receiving hopper.

8. A mixing machine comprising an upstanding hollow member, an upstanding receiving chamber with which said hollow member communicates at its upper portion, a lifting element in said hollow member for elevating different ingredients to be commingled together through the hollow member and to the receiving chamber, a conveying connection between said receiving chamber and a lower portion of said upstanding hollow member, and means controlling said conveying connection for directly and continuously concurrently operating upon a plurality of said different ingredients to successively and positively separate and remove small quantities of each ingredient operated upon from a main quantity thereof and to cause the small separated and removed quantities of the different ingredients, respectively, to become intimately commingled together.

9. A mixing machine comprising an upstanding hollow member, an upstanding receiving chamber with which said hollow member communicates at its upper portion, a lifting element in said hollow member for elevating different ingredients to be commingled together through the hollow member and to the receiving chamber, a gravity conveying connection between said receiving chamber and a lower portion of said upstanding hollow member, and means controlling said conveying connection for directly and continuously concurrently operating upon a plurality of said different ingredients and successively and positively separating and removing small quantities of each ingredient operated upon from a main quantity of the ingredients and causing the small separated and removed quantities of the different ingredients, respectively, to become intimately commingled together.

10. A mixing machine adapted to receive a plurality of different ingredients to be commingled together, comprising an upstanding hollow member having a rotatable lifting element therein for conveying different ingredients one after another upwardly, an upstanding chamber for receiving the different ingredients conveyed upwardly through said hollow member, an upstanding passageway to which said receiving chamber is adapted to deliver portions of material from different ingredients in said receiving chamber, said upstanding passageway being above and communicating with a lower portion of said hollow member and including an upstanding elongated inlet leading from said receiving chamber, and a rotatable, elongated reducing blade adjacent to and extending longitudinally of said elongated inlet and adapted to directly and continuously concurrently operate upon a plurality of different ingredients in the receiving chamber and successively and positively separate and remove small quantities of each ingredient from a main quantity thereof and cause the small separated and removed quantities of the different ingredients to be deposited in said upstanding passageway.

11. The combination as specified in claim 10, wherein said rotatable lifting element is constituted as a mixing conveyor adapted to deliver material from said hollow member to an upper portion of said receiving chamber with a swirling motion.

12. A mixing machine comprising an upstanding hollow member, an upstanding receiving chamber surrounding said hollow member, a rotatable lifting element in said hollow member for conveying material upwardly through the hollow member to the receiving chamber, an upstanding elongated passageway within said receiving chamber including an upstanding elongated inlet to said passageway from said receiving chamber, a lower portion of said hollow member being at elevation below said passageway, a communicating connection between the passageway and said lower portion of the hollow member, and a rotatable reducing element in said passageway for successively removing portions of material from the receiving chamber and depositing said portions in the passageway.

13. A mixing machine comprising an upstanding hollow member, an upstanding receiving chamber surrounding said hollow member, a rotatable lifting element in said hollow member for conveying material upwardly through the hollow member and causing said material to enter an upper portion of said receiving chamber with a turbulent, swirling motion, an upstanding elongated passageway within said receiving chamber adjacent to said hollow member, said upstanding passageway having an upstanding elongated inlet leading from said receiving chamber, a lower portion of said hollow member being at elevation below said passageway, a communicating connection between the passageway and said lower portion of the hollow member, and a rotatable reducing element adjacent said elongated inlet for successively removing portions of material from the receiving chamber and depositing said portions in said passageway.

14. A mixing machine comprising an upstanding hollow member, an upstanding downwardly tapering receiving chamber surrounding said hollow member, a rotatable lifting element in said hollow member for conveying material upwardly through the hollow member to an upper portion of the receiving chamber, an upstanding elongated passageway within said receiving chamber, there being an upstanding elongated inlet to said passageway at an inner portion of said upstanding downwardly tapering receiving chamber and at a side of said passageway, a lower portion of said hollow member being at elevation below the elevation of the elongated inlet to said passageway, a communicating connection between the passageway and said lower portion of the hollow member, and a rotatable reducing element adjacent said elongated inlet for successively removing portions of material bit by bit from said receiving chamber and depositing said removed portions into said passageway.

15. In a mixing machine, a material receiving chamber, an upstanding, gravity flow outlet passageway leading from an interior portion of said receiving chamber, an upstanding elongated inlet from said receiving chamber to said passageway at a side of the passageway, and a rotatable material reducing element extending longitudinally of said elongated inlet and adapted to successively remove portions of material bit by bit from said receiving chamber and deposit said removed portions into said passageway.

16. The combination as specified in claim 15, wherein a lower part of said material receiving chamber at the elevation of a portion of said elongated inlet is of downwardly tapering configuration.

17. The combination as specified in claim 15, wherein said rotatable material reducing element consists of a plurality of beaters disposed in angular relation to each other.

18. A mixing machine comprising a hopper for receiving a plurality of different ingredients to be mixed, an upstanding hollow member having a rotatable lifting element therein for conveying different ingredients from said hopper, a mixing chamber for receiving the different ingredients from said hollow member, a passageway for receiving ingredients from said mixing chamber, said passageway communicating with said hopper, a smaller hopper, a tube leading from said smaller hopper to said passageway, and a rotatable feed screw in said tube.

19. In a mixing machine, a downwardly tapering material receiving chamber, an upstanding gravity flow outlet passageway leading from an interior portion of said receiving chamber, an upstanding elongated inlet to said passageway from said material receiving chamber and at the elevation of a downwardly tapering part of the chamber, said elongated inlet being at a side of said passageway adjacent to a wall of said receiving chamber, and a rotatable material reducing element, consisting of a plurality of beaters extending longitudinally of said elongated inlet, adapted to successively remove portions of material bit by bit from said receiving chamber and deposit said removed portions into said passageway.

20. The combination as specified in claim 2, wherein said lifting element is adapted to convey different ingredients from said hollow member to said receiving chamber with a turbulent, swirling motion.

21. In a mixing machine, a material receiving chamber, an upstanding, gravity flow outlet passageway leading from an interior portion of said receiving chamber, an upstanding elongated inlet from said receiving chamber to said passageway at a side of the passageway, and a rotatable material reducing element in said passageway and adapted to successively remove portions of material bit by bit from said receiving chamber.

22. A mixing machine comprising means including a feeding element, a hollow member, a receiving chamber and conveying connections between said hollow member and said receiving chamber for circulating different ingredients to be commingled together, said hollow member being adapted to contain a plurality of said different ingredients in bodily contact with each other, and means for directly and continuously concurrently operating upon a plurality of said different ingredients to successively and positively separate and remove small quantities of each ingredient operated upon from a main quantity thereof to cause the small separated and removed quantities of the different ingredients, respectively, to become intimately commingled together.

HARRY G. DAY.